UNITED STATES PATENT OFFICE.

SALOMON HEIMANN, OF NEW YORK, N. Y., ASSIGNOR OF ELEVEN-TWENTIETHS TO IRVING H. BROWN, OF PLAINFIELD, NEW JERSEY.

NON-CONDUCTING COMPOSITION.

SPECIFICATION forming part of Letters Patent No. 393,644, dated November 27, 1888.

Application filed November 3, 1887. Serial No. 254,213. (No specimens.)

*To all whom it may concern:*

Be it known that I, SALOMON HEIMANN, of the city, county, and State of New York, have invented certain new and useful Improvements in Non-Conducting Compositions, of which the following is a specification.

This invention relates to an improved composition made from peat, which forms a superior non-conducting covering for underground wires and a good insulating material for electrical purposes generally and for making battery-cells and the like; and the invention consists of a non-conducting composition which is composed of peat, asphaltum, plumbago, plaster-of-paris, soluble glass, and water, and which is compacted together by heat and pressure and prepared in the following manner and proportions: The peat is cut from the peat moor or bog and pressed, by means of a hydraulic or other press, so as to remove from eighty to eighty-five per cent. of the water contained therein. The compressed pieces are then dried either in the atmosphere or by suitable drying apparatus. The dried peat is then ground by suitable machinery and screened until a fine meal is obtained. Sixty pounds of this peat-meal, twenty-five pounds of ground asphaltum, and two and one-half pounds of pulverized plumbago are mixed with each other and then moistened by adding a thin solution of five pounds of plaster-of-paris in a sufficient quantity of water and of soluble glass in water. This mass is rolled out by heated rollers and then pressed by heated dies and molds into the required shape, the melting of the asphaltum forming a hard homogeneous mass, which partakes of the characteristic of hard rubber, but contains no rubber and does not require vulcanization. The cells or other articles formed from the peat composition may be coated with paraffine, the result being a water and acid proof composition which is a good non-conductor, and which can be applied to all articles and purposes for which hard rubber has been used heretofore.

Having thus described my invention, I claim as new and desire to secure by Letters Patent—

A non-conducting composition composed of a mixture of dry pulverized peat, ground asphaltum, pulverized plumbago, plaster-of-paris, soluble glass, and water compacted by heat and pressure, substantially as set forth.

In testimony that I claim the foregoing as my invention I have signed my name in presence of two subscribing witnesses.

SALOMON HEIMANN.

Witnesses:
PAUL GOEPEL,
CARL KARP.